(12) United States Patent
Biswas et al.

(10) Patent No.: US 9,122,702 B2
(45) Date of Patent: Sep. 1, 2015

(54) METHOD AND APPARATUS FOR PROVIDING LOCATION TRAJECTORY COMPRESSION BASED ON MAP STRUCTURE

(71) Applicant: Nokia Corporation, Espoo (FI)

(72) Inventors: Debmalya Biswas, Lausanne (CH); Nikolai Nefedov, Gattikon (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/652,820

(22) Filed: Oct. 16, 2012

(65) Prior Publication Data

US 2014/0108361 A1 Apr. 17, 2014

(51) Int. Cl.
*G06F 17/30* (2006.01)

(52) U.S. Cl.
CPC ...... *G06F 17/30241* (2013.01); *G06F 17/3087* (2013.01)

(58) Field of Classification Search
CPC ............... G01C 21/3667; G01C 21/26; G01C 21/3629; G01C 21/3632; G01C 21/3644; G01C 21/3655; G01C 21/3658; G01C 21/367; G01C 21/30; G01C 21/36; G01C 21/34; G01C 21/20; G06F 3/0484; G06F 17/3087; G06F 17/30241; G06F 17/30; G06F 30/04847; H04L 65/4069; H04R 29/00; H04R 29/06; H04W 84/18; H04W 40/12; H04W 40/18; H04W 40/20; H04W 40/24; G06Q 90/20
USPC ......... 701/200, 201, 202, 208, 211, 408, 537, 701/533, 209, 213, 210, 117, 207, 283, 57; 715/764, 702, 781, 788; 455/456.1, 455/456.6; 345/636, 419; 707/759, 803, 707/737, 736, 693, E17.002, E17.005, 707/E14.014, E17.089, E17.014, 754, 740, 707/758, 752, E17.009, E17.058; 709/219; 381/56

See application file for complete search history.

(56) References Cited

U.S. PATENT DOCUMENTS 3,542,497 A * 11/1970 Chapuis .......................... 418/84
5,019,433 A *  5/1991 Briggs et al. ................. 428/35.7
5,109,433 A *  4/1992 Notenboom .......... 707/E17.058
5,944,769 A *  8/1999 Musk et al. .................... 701/533

(Continued)

FOREIGN PATENT DOCUMENTS

WO 2009/149926 A2 12/2009

OTHER PUBLICATIONS

Dillenburg, J.F. et al.—"Applications of a transportation information architecture"—Published in: Networking, Sensing and Control, 2004 IEEE International Conference on (vol. 1 ); Date of Conference: Mar. 21-23, 2004—pp. 480-485.*

(Continued)

*Primary Examiner* — Anh Ly
(74) *Attorney, Agent, or Firm* — Ditthavong & Steiner, P.C.

(57) ABSTRACT

An approach is provided for compressing location trajectories based on map structure. A compression platform causes, at least in part, a mapping of at least one location trajectory to at least one map to determine one or more intersections traveled along the at least one location trajectory. The compression platform further determines at least one compression key based, at least in part, on one or more outgoing roads of the one or more intersections. The compression platform also causes, at least in part, a compression of the at least one location trajectory based, at least in part, on the at least one compression key.

18 Claims, 12 Drawing Sheets

(56) References Cited

U.S. PATENT DOCUMENTS

| | | | |
|---|---|---|---|
| 6,028,550 A * | 2/2000 | Froeberg et al. | 455/456.6 |
| 6,850,840 B1 * | 2/2005 | Willenbrock et al. | 701/409 |
| 6,898,516 B2 * | 5/2005 | Pechatnikov et al. | 701/411 |
| 6,904,360 B2 * | 6/2005 | Pechatnikov et al. | 701/532 |
| 6,917,878 B2 * | 7/2005 | Pechatnikov et al. | 701/411 |
| 7,089,110 B2 * | 8/2006 | Pechatnikov et al. | 701/411 |
| 7,114,729 B2 * | 10/2006 | Kim | 280/5.513 |
| 7,298,289 B1 * | 11/2007 | Hoffberg | 340/903 |
| 8,874,477 B2 * | 10/2014 | Hoffberg | 705/37 |
| 2001/0036224 A1 | 11/2001 | Demello et al. | |
| 2005/0033511 A1 * | 2/2005 | Pechatnikov et al. | 701/210 |
| 2005/0107993 A1 * | 5/2005 | Cuthbert et al. | 703/2 |
| 2006/0168082 A1 * | 7/2006 | Yang et al. | 709/207 |
| 2006/0206261 A1 * | 9/2006 | Altaf et al. | 701/209 |
| 2007/0063875 A1 * | 3/2007 | Hoffberg | 340/995.1 |
| 2007/0070069 A1 * | 3/2007 | Samarasekera et al. | 345/427 |
| 2007/0087756 A1 * | 4/2007 | Hoffberg | 455/450 |
| 2007/0219714 A1 * | 9/2007 | Uchida et al. | 701/209 |
| 2009/0210151 A1 * | 8/2009 | Toyoda | 701/208 |
| 2010/0042304 A1 * | 2/2010 | Naik et al. | 701/70 |
| 2010/0114484 A1 * | 5/2010 | Kida et al. | 701/208 |
| 2010/0250369 A1 * | 9/2010 | Peterson et al. | 705/14.58 |
| 2010/0250619 A1 * | 9/2010 | Hulubei | 707/803 |
| 2010/0318291 A1 * | 12/2010 | Gluck | 701/208 |
| 2011/0040480 A1 * | 2/2011 | Tebbutt | 701/211 |
| 2011/0041719 A1 * | 2/2011 | Ivtsenkov | 102/209 |
| 2011/0087425 A1 * | 4/2011 | Deng et al. | 701/200 |
| 2011/0112760 A1 * | 5/2011 | Serbanescu et al. | 701/204 |
| 2013/0281140 A1 * | 10/2013 | Rubin et al. | 455/500 |
| 2013/0297207 A1 * | 11/2013 | Mason et al. | 701/533 |
| 2013/0332077 A1 * | 12/2013 | Khetan et al. | 701/533 |

OTHER PUBLICATIONS

Gerben de Vries, and Maarten van Someren—"Clustering Vessel Trajectories with Alignment Kernels under Trajectory Compression"—Machine Learning and Knowledge Discovery in Databases—Lecture Notes in Computer Science vol. 6321, 2010, pp. 296-311.*

A. Suzuki, et al., "A user location anonymization method for location based services in a real environmen," GIS '10 Proceedings of the 18th SIGSPATIAL International Conference on Advances in Geographic Information Systems, pp. 398-401.

H. Shin, et al., "A Profile Anonymization Model for Privacy in a Personalized Location Based Service Environment," MDM '08 Proceedings of the the Ninth International Conference on Mobile Data Management, pp. 73-80.

C.Y. Ling, et al., "Compressing Trajectories Using Inter-Frame Coding." Technical Report No. TR-IIS-10-007, pp. 1-25, Sep. 8, 2010.

* cited by examiner

METHOD AND APPARATUS FOR PROVIDING LOCATION TRAJECTORY COMPRESSION BASED ON MAP STRUCTURE

BACKGROUND

Service providers and device manufacturers (e.g., wireless, cellular, etc.) are continually challenged to deliver value and convenience to consumers by, for example, providing compelling network services. For example, location-aware applications and services are becoming popular on mobile devices (e.g., smart phones, tablets, etc.). Such applications and services rely on both real-time as well as historical location information to better predict and adapt the applications and services to user behavior. Benefits exist in storing historical location information on the mobile devices. Yet mobile devices are usually constrained by the available on-device storage. Accordingly, service providers and device manufacturers face significant technical challenges in storing historical location information on mobile devices for use with location-aware applications and services.

SOME EXAMPLE EMBODIMENTS

Therefore, there is a need for an approach for compressing location trajectories based on map structure.

According to one embodiment, a method comprises causing, at least in part, a mapping of at least one location trajectory to at least one map to determine one or more intersections traveled along the at least one location trajectory. The method also comprises determining at least one compression key based, at least in part, on one or more outgoing roads of the one or more intersections. The method further comprises causing, at least in part, a compression of the at least one location trajectory based, at least in part, on the at least one compression key.

According to another embodiment, an apparatus comprises at least one processor, and at least one memory including computer program code for one or more computer programs, the at least one memory and the computer program code configured to, with the at least one processor, cause, at least in part, the apparatus to map at least one location trajectory to at least one map to determine one or more intersections traveled along the at least one location trajectory. The apparatus is also caused to determine at least one compression key based, at least in part, on one or more outgoing roads of the one or more intersections. The apparatus is further caused to compress the at least one location trajectory based, at least in part, on the at least one compression key.

According to another embodiment, a computer-readable storage medium carries one or more sequences of one or more instructions which, when executed by one or more processors, cause, at least in part, an apparatus to map at least one location trajectory to at least one map to determine one or more intersections traveled along the at least one location trajectory The apparatus is also caused to determine at least one compression key based, at least in part, on one or more outgoing roads of the one or more intersections. The apparatus is further caused to compress the at least one location trajectory based, at least in part, on the at least one compression key.

According to another embodiment, an apparatus comprises means for causing, at least in part, a mapping of at least one location trajectory to at least one map to determine one or more intersections traveled along the at least one location trajectory. The apparatus also comprises means for determining at least one compression key based, at least in part, on one or more outgoing roads of the one or more intersections. The apparatus further comprises means for causing, at least in part, a compression of the at least one location trajectory based, at least in part, on the at least one compression key.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for compressing location trajectories based on map structure are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
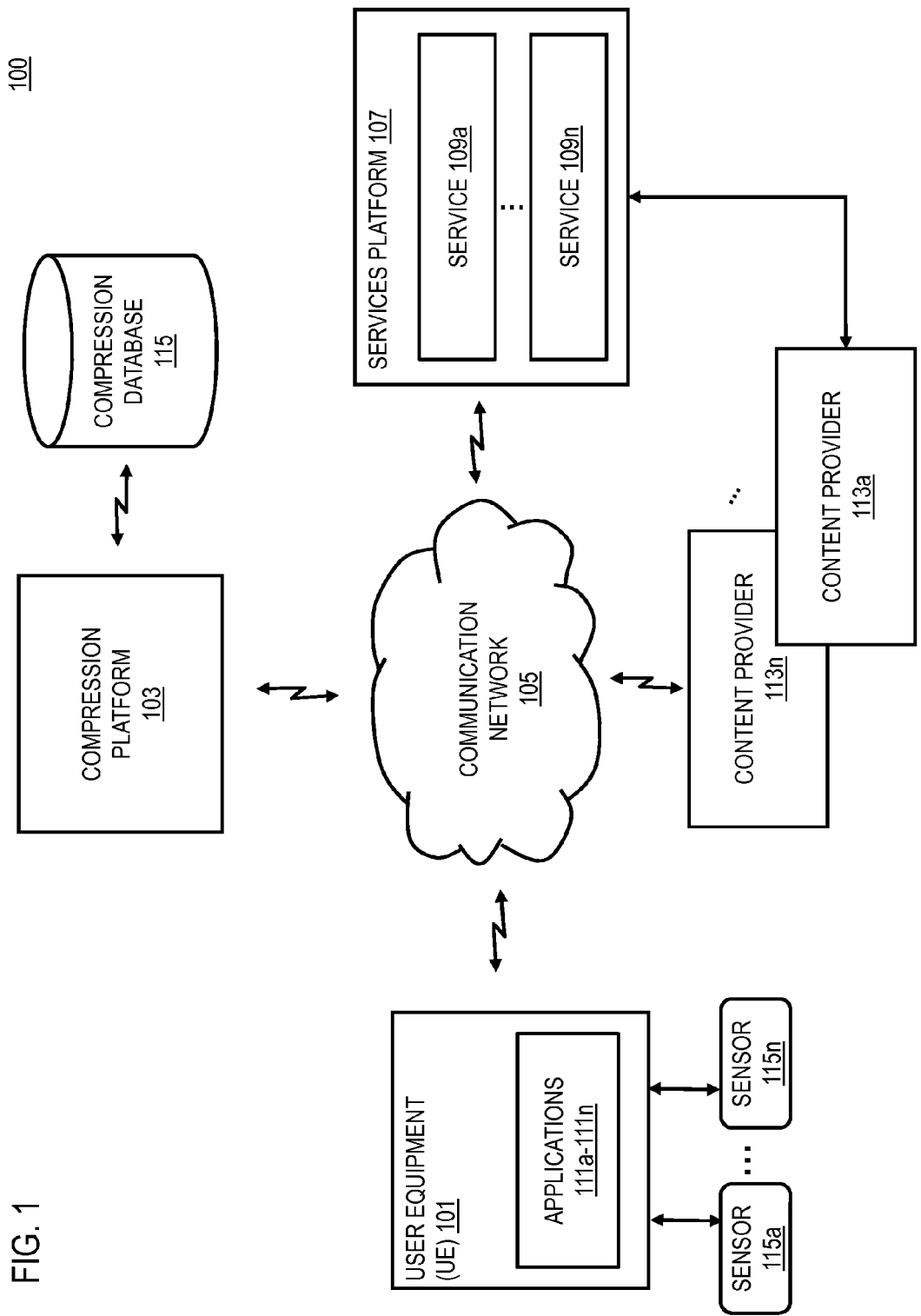
FIG. 1 is a diagram of a system capable of compressing location trajectories based on map structure, according to one embodiment.

FIG. 1 is a diagram of a system capable of compressing one or more location trajectories based on map structure, according to one embodiment. As discussed above, location-aware applications and services are increasing in popularity, particularly with respect to mobile devices (e.g., smart phones, tablets, navigation devices, etc.). Such applications and services rely on both real-time as well as historical location information to better predict and adapt themselves to user behavior. By way of example, historical location information may consist of location trajectories recorded by a mobile device. The location trajectories may be stored entirely on the mobile device (space permitting), stored entirely on the cloud (e.g., backend servers), or stored partly on the mobile device and partly on the cloud. Due to connectivity issues, however, as well as, for example, fast access, it may be beneficial to store as much of the location trajectories on the mobile device (or other user device rather than at the backend servers). However, storing the location trajectories on the mobile device leads to storage issues as the on-device storage is usually limited. In addition, location trajectories can be highly sensitive from a privacy perspective so location trajectories may need to be protected from misuse, such as by anonymization.

To address these problems, a system 100 of FIG. 1 introduces the capability to compress and anonymize location trajectories by using the underlying structure of maps for the compression and/or anonymization. The system 100 generates a compression key that is based on the underlying map structure to perform the compression and decompression of location trajectories. The system 100 also introduces the capability to perform partial compression and/or anonymization given one or more intermediate roads and/or intersections along a location trajectory. The system 100 also introduces the ability to optimize the compression of location trajectories based on context information associated with a user, such as commuting patterns of the user, and adapting to changes in such patterns (e.g., such as changes to the user's home and/or office). Further, by using the underlying map structure, the system 100 allows for compression and decompression algorithms that are relatively fast and simple (such as being linear in complexity) as compared to conventional compression algorithms and methods. Further, the compressed trajectories may be stored at the mobile devices.

As shown in FIG. 1, the system 100 comprises a user equipment (UE) 101 having connectivity to a compression platform 103 via a communication network 105. Although FIG. 1 illustrates only one UE 101, the system 100 may include any number of UEs 101 (e.g., more than one). By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111). The applications 111 may be any type of application that can execute at the UE 101, such as one or more mapping applications, navigation applications, communication applications (e.g., email, SMS, MMS, etc.), Internet browser applications, calendar applications, and the like. In one embodiment, the functionality performed by the compression platform 103 may be embodied in one or more applications 111, such as an application 111*a* that entirely performs the functionality of the compression platform 103 such that the compression platform 103 is embodied by the application 111*a* at the UE 101. One or more of the applications 111 may also be used to set one or more user profiles and/or determine user preference information with respect to one or more roads and/or intersections to be used in generating a compression key and/or compressing and decompressing the location trajectories.

The UE 101 may also include one or more sensors 115*a*-115*n* (collectively referred to as sensors 115). The sensors 115 may be any type of sensor that may be located at or associated with the UE 101, such as one or more light sensors, one or more motion sensors (e.g., accelerometer), one or more location-based sensors (e.g., GPS receiver/sensor for determining a location of the UE 101), and the like. The sensors 115 may be used to determine context information associated with the UE 101 and the user of the UE 101, such as determining the location of the UE 101 and presumably the location of the user associated with the UE 101. In one embodiment, one or more of the sensors 115 may interact with the applications 111 to transmit context information associated with the UE 101 and the user of the UE 101 to the compression platform 103. In one embodiment, one or more of the sensors 115 may interact directly with the compression platform 103 for transmitting context information associated with the UE 101 and the user of the UE 101 to the compression platform 103.

The system 100 may further include a services platform 107 that includes one or more services 109*a*-109*n* (collectively referred to as services 109). The services 109 may be any type of service that may be provided to one or more elements of the system 100. By way of example, the one or more services 109 may include navigation services, mapping services, augmented reality services, calendar services, Internet browsing services, communication services, and the like. In one embodiment, the functions and/or services provided by the compression platform 103 may be partially or entirely performed by one or more of the services 109 at the services platform 107.

The system 100 may further include one or more content providers 113*a*-113*n* (collectively referred to as content providers 113). The content providers 113 may provide various content to the elements of the system 100, such as to the UE 101 and/or the compression platform 103. The content may be, for example, one or more maps for using as map structure when compressing and/or decompressing location trajectories or when determining a compression key to compress and decompress location trajectories.

The system 100 also includes the compression platform 103 that provides the functionality associated with compressing location trajectories based on map structure within the system 100. In one embodiment, the compression platform 103 may be connected to or in communication with a compression database 115 that stores information regarding one or more maps, such as the structure for the one or more maps, one or more compression keys or partial compression keys associated with the one or more maps and/or one or more users, and one or more compressed trajectories associated with one or more users. In one embodiment, the compression keys and/or the compressed trajectories may alternatively, or in addition, be stored at the UE 101 of the respective user associated with the compression key and/or compressed trajectories.

In one embodiment, a map M may be modeled as a undirected graph, such as where M=G(V, E) and E={$a_1, a_2, \ldots, a_n$} which represents the set of edges with each edge in E corresponding to at least a part of a road or street represented within the map M between a pair of states or intersections (vertices) (e.g., $s_1$ and $s_2$) in V. For example, the pair of states $s_1$ and $s_2$ may correspond to the states where road $a_1$ begins and ends between two closest neighboring and intersecting roads with the road $a_1$. According to the foregoing example, a road within the map M may consist of a set of unique labels if the street has intersections with another street.

Initially, a location trajectory may be in the form of, for example, a location trajectory of GPS coordinates. In which case, the location trajectory may then be converted into a sequence of roads (e.g., the edges) and/or intersections between roads. For example, location trajectory t may consist of a sequence of location coordinates (e.g., latitude, longitude). The compression platform 103 may then apply a filtering function to the location trajectory t according to, for example, $f(t)=f((lat_1,long_1)(lat_2,long_2) \ldots (lat_n,long_n))=a_1, a_2, \ldots a_m$, in which duplicate adjacent labels are removed to avoid redundancy (m<=n), to determine the roads associated with the location trajectory. Thus, by way of example, given a map M, a location trajectory r is a sequence of roads $a_1, a_2, \ldots, a_m$ that follow the location trajectory taken by the user applied to the roads of the map. The location trajectory r may also (or alternatively) be represented by pairs of states corresponding to the roads, such as $s_1, s_2, s_3, \ldots, s_n$ where $a_1=(s_1, s_2)$ and $a_2=(s_2, s_3)$. Note that the roads $a_1$ and $a_2$ are connected, as represented by the roads sharing the state $s_2$.

In one embodiment, the compression platform 103 allows incomplete trajectories. For example, some parts of a location trajectory may be incomplete or missing, such as where the GPS signal is lost for a period of time when the user is moving. The compression platform 103 may reconstruct the location trajectory by estimating the location trajectory based on a set of possible routes of prescribed length between starting and ending states where the location trajectory is missing. The compression platform 103 may reconstruct the route using, for example, Katz similarity measurement applied to a subgraph covering the missing part of the location trajectory.

With the structure of a map and a location trajectory converted into roads a and/or states s, the compression platform 103 may then compress the location trajectory in such a way that the underlying location trajectory information is preserved. A compression key C may be used to compress the location trajectory. The compression key C may be a set of roads such that C={$a_1, a_2, \ldots, a_n$}. The compression key C may be determined based on the map structure that includes, at least in part, roads within the location trajectory and one or more roads intersecting with the roads within the location trajectory, or one or more intersections associated with the location trajectory. In one embodiment, for example, for each state s (e.g., intersection) within the map structure (or a smaller division of the map structure), if s has l≥1 outgoing roads (e.g., say ($a_1, a_2, \ldots, a_l$), i.e., $s_b(a_1)=s_b(a_2) \ldots = s_b(a_l)=s$), then l−1 roads are randomly chosen from among the outgoing roads and are added to the compression key C. If there is only one outgoing road (e.g., l=1), then that road does not need to be added to the compression key C. Thus, by way of example, if a state s has four outgoing roads $a_1, a_2, a_3$ and $a_4$, then three of the outgoing roads are randomly chosen to be included within the compression key C, such as $a_1, a_3$ and $a_4$. In one embodiment, a road between two intersections may be designated as different outgoing roads based on the intersection. Thus, for example, for intersection $s_1$, road a may be designated as outgoing road $a_{1,2}$. However, for intersection $s_2$, road a may be designated as outgoing road $a_{2,1}$. In one embodiment, the outgoing roads of a state s may include the road upon which the user traveled on to arrive at state s (e.g., the incoming road). In one embodiment, the outgoing roads of a state s may not include the incoming road upon which the user traveled on to arrive at state s. Accordingly, the compression key C is, at least in part, the combination of randomly chosen roads at intersections (e.g., states) traveled by the user according and within the user's location trajectory.

Using the above compression key, a location trajectory may then be compressed. Given a filtered location trajectory of roads $f(t)=a_1, a_2, \ldots, a_m$, and the compression key C as computed above for the location trajectory, the location trajectory may be compressed by removing the roads from within the location trajectory that are not in the compression key C while keeping the first and last roads and roads that are within the compression key C. Thus, for a state s with outgoing roads $a_1, a_2, a_3$ and $a_4$ within the filtered location trajectory $f(t)$, if the user continued on road $a_2$ and road $a_2$ was not one of the roads randomly selected for the compression key C, the filtered location trajectory $f(t)$ may be compressed by removing the road $a_2$. However, if road $a_2$ was one of the roads randomly chosen for the compression key, then road $a_2$ is left within the location trajectory. The road $a_2$ is left within the location trajectory (i.e., is within the compressed location trajectory) because there is otherwise no way of knowing that the user took road $a_2$ from the state s if the road is removed from the compressed location trajectory.

A compressed location trajectory may then be decompressed based on a reversal of the compression process using the compression key. The underlying point of the decompression is for a pair of adjacent roads $a_i, a_{i+1}$ within the compressed location trajectory (i.e., not necessarily adjacent on the map), if $s_e(a_i) \ne s_b(a_{i+1})$ then the route undertaken between $s_e(a_i)$ and $s_b(a_{i+1})$ needs to be reconstructed based on the roads omitted from the compression key. The route undertaken is determined based on the structure of the map including the roads between the states (e.g., intersections) represented by $s_e(a_i)$ and $s_b(a_{i+1})$.

In one embodiment, by way of example, a decompression algorithm may be as follows:

```
let the decompressed trace D(t) = a₁; // where a₁ is the first road of the
compressed location trajectory;
Set variable i = 1 and current state s_C = s_e(a_i)
while (i <= m-1) do;
    if (s_C == s_b(a_m));
        D(t) = D(t).a_m; // where . is the concatenation operator
        Output D(t);
    else if (s_C == s_b(a_{i+1}));
        D(t) = D(t).a_{i+1};
        i++;
        s_C = s_b(a_i);
    else
        Determine a_r such that s_C == s_b(a_r) but a_r is not in C_K;
        D(t) = D(t).a_r;
        s_C = s_e(a_r);
endwhile;
```

Thus, based on the foregoing exemplary algorithm, starting with the first road of the compressed location trajectory, if the first road and the next road are adjacent roads within the map structure, the next road is analyzed. Else, if there is a gap between the first road and the next road, the compression key is checked to see what outgoing road associated with the intersection is missing from the compression key. The missing outgoing road is determined to be the next road after the first road and is added to the location trajectory. The foregoing is repeated until the last road of the location trajectory is reached.

The compression platform 103 may employ other approaches for determining a compression key C with a trade-off between achieving higher compression (e.g., reducing the compressed location trajectory size) and increasing the complexity of the decompression algorithm (and thereby requiring more processing power and memory). By way of example, in one embodiment, the compression platform 103 may support partial compression. For example, given a location trajectory of $t=a_1, a_2, \ldots, a_x, \ldots, a_m$, the location trajectory may be compressed up to a specified point in the location trajectory, such as up to $a_x$ while leaving the remaining portion of the location trajectory not compressed (e.g., after $a_x$ up to $a_m$).

In one embodiment, the compression platform 103 may anonymize the location trajectory taken by the user based on, for example, the roads that are missing from within the compressed location trajectory. The anonymity for a route may be determined according to an anonymity level k where for a part of adjacent roads $a_i$ and $a_{i+1}$ within the compressed location trajectory, if $s_e(a_i) \ne s_b(a_{i+1})$ then the number n of possible routes between $s_e(a_i)$ and $s_b(a_{i+1})$ equals the anonymity level k. Thus, the anonymity level k implies that the compressed route cannot be differentiated among k possible routes between the two states $s_e(a_i)$ and $s_b(a_{i+1})$. Because the number of anonymity depends on the route taken, and therefore the number of outgoing roads that allows for compressing the location trajectory, the anonymity may sometimes not be able to guarantee a specific anonymity level k. In such a case where the anonymity level offered by a compressed location trajectory is less than the anonymity level k, the anonymity may be increased by deleting additional roads from the compressed location trajectory. In one embodiment, a heuristic would be to delete roads a from a compressed location trajectory such that the states $s_b(a)$ has the maximum number of outgoing roads leading to potentially the maximum confusion for that part of the route.

In one embodiment, the compression platform 103 allows for an adaptive compression key that may be adapted to user patterns. By way of example, rather than choosing the l–1 random roads for an intersection to include within the compression key, the compression key may be determined by choosing the roads included within the compression key while taking into account the user's characteristics. By way of example, let a state s have 5 outgoing roads (e.g., $a_1, a_2, a_3, a_4$, and $a_5$), four roads randomly selected out of the five may be $\{a_1, a_2, a_4, a_5\}$. However, if the user always (or most of the time) takes road $a_3$ while exiting state s, then the compression is not optimal because $a_3$ will always (or most of the time) remain within the compressed location trajectory. However, given the user's characteristics, the compression key can be adapted to include $a_3$ while removing one of the other roads (e.g., $a_1, a_2, a_4$, or $a_5$) leading to a better compression.

TABLE 1

Example daily location trajectory.

| Number | Lat | Long | time_stamp | node | checkin | checkout | duration | Loc_anchor |
|---|---|---|---|---|---|---|---|---|
| 1 | 47.375390 | 8.546677 | 1322727000 | $s_0$ | | 8:10 | 610 min | home |
| 2 | 47.375288 | 8.546312 | 1322727123 | — | | | | |
|   | 47.375041 | 8.545883 | 1322727255 | — | | | | |
|   |   |   |   | $s_2$ | | | | |
| ... | ... | ... | ... | ... | | | | |
| K |   |   | 1322731801 | $s_{13}$ | 09:30 | 12:20 | 150 min | office |
| ... |   |   |   |   | | | | |
| L |   |   | 1322742603 | $s_{17}$ | 12:30 | 13:10 | 40 min | (café) |
| M |   |   | 1322771405 | $s_0$ | 20:30 | | | home |

According to the above technique, trajectories of a user may be clustered to derive a compression key as a cluster centroid. Based on this technique, the compression key may be computed dynamically based on the user's travel patterns (e.g., commuting patterns) and adapted to change the patterns based on influences such as, for example, a change in home, office, etc. By way of example, and to implement the foregoing, a location trajectory may be considered as a triplet of {time stamp, longitude, latitude} recorded over 24 hours. For example, the starting point for the 24 hour period may be at 4 AM local time assuming that the user is staying at home over night. Thus, most trajectories would form a loop starting at home at 4 AM and ending at home 24 hours later. By way of example, Table 1 may represent a location trajectory for a 24 hour period such that the location trajectory $r_S = \{t_K, d_K; s_K; t_J, d_J, s_J; \ldots; t_M, d_M, s_M\}$, where $t_K$ represents a check-in time into the state $s_K$ and $d_K$ corresponds to a duration staying at the state $s_K$. Based on the above information, the compression platform 103 may determine one or more location anchors or nodes $L_J$. The location nodes may be, for example, determined according to a time that a user spends at the specified node, such as where a node $s_J$ exists when $d_J$ is greater a set threshold of time (e.g., 30, 60 or 120 minutes). After determining the location nodes, all available trajectories $r_S$ may be grouped into $n_L = |L_i|$ clusters. In one embodiment, $L_i$ may be detected over all available sets of location trajectories and may change as more trajectories are collected.

The location trajectories in Tables 2.1-3 may be efficiently compressed by deriving the compression key as the cluster centroid. By way of example, for symbolic trajectories in Table 2.1 the compression key in the form of states may be $C = \{s_0, s_2, s_5, s_7, s_9, s_{10}, s_{11}, s_{12}, s_{13}, s_{17}, s_{13}, s_{12}, s_{11}, s_{10}, s_9, s_7, s_5, s_2, s_0\}$ or in form of street labels may be $C = \{a_{0,2}, a_{5,7}, a_{7,9}, a_{9,10}, a_{10,11}, a_{11,12}, a_{12,13}, a_{13,17}, a_{0,2}, a_{5,7}, a_{7,9}, a_{9,10}, a_{10,11}, a_{11,12}, a_{12,13}, a_{13,17}\}$, which corresponds to a sequence of locations anchors (e.g., home, office, cafe, office, home). In which case, the compression key represents that roads that the user took along the location trajectory rather than the random roads excluding the road that the user took. Thus, when decompressing the compressed location trajectory, the roads of the compression key are added to the decompressed location trajectory rather than the missing road.

Over time, a user's commuting patterns may change based on, for example, changes to the user's home or office. To account for these changes, the compression platform 103 may determine dynamic compression keys. For example, if a user would go 4 times a week to fitness after the working hours, then the route in Table 2.3 would dominate as enough statistics are collected and the compression key may be changed to $C = \{s_0, s_2, s_5, s_7, s_9, s_{10}, s_{11}, s_{12}, s_{13}, s_{17}, s_{13}, s_{12}, s_{11}, s_{10}, s_9, s_7, s_4, s_1, s_0\}$. In one embodiment, to be able to reconstruct previously recorded routes, the compression platform 103 also keeps a history of compression keys including the time period when they are valid.

TABLE 2.1

Exemplary location trajectory with determined nodes of Office and Cafe.

| Home | Office | Cafe | Office | | Home |
|---|---|---|---|---|---|
| $s_0$ | $s_2 s_5 s_7 s_9 s_{10} s_{11} s_{12}$ $s_{13}$ | $s_{17}$ | $s_{13}$ | $s_{12} s_{11} s_{10} s_9 s_7 s_5 s_2$ | $s_0$ |
| $s_0$ | $s_1 s_4 s_7 s_9 s_{10} s_{11} s_{12}$ $s_{13}$ | $s_{17}$ | $s_{13}$ | $s_{12} s_{11} s_{10} s_9 s_7 s_5 s_2$ | $s_0$ |

TABLE 2.2

Exemplary location trajectory with determined nodes of Office, Cafe and Shop.

| Home | Office | Cafe | Office | Shop | | Home |
|---|---|---|---|---|---|---|
| $s_0$ | $s_2 s_5 s_7 s_9 s_{10} s_{11} s_{12}$ $s_{13}$ | $s_{12}$ | $s_{13}$ | $s_{12}$ $s_{16}$ | $s_{11} s_{10} s_9 s_7 s_5 s_2$ | $s_0$ |

TABLE 2.3

Exemplary location trajectory with determined nodes of Office, Cafe and Fitness.

| Home | Office | Cafe | Office | | Fitness | Home |
|---|---|---|---|---|---|---|
| $s_0$ | $s_2 s_5 s_7 s_9 s_{10} s_{11} s_{12}$ $s_{13}$ | $s_{12}$ | $s_{13}$ | $s_{12} s_{11} s_{10} s_9 s_7 s_4$ | $s_1$ | $s_o$ |

In one embodiment, for more complicated scenarios with a large diversity among trajectories, the simple majority rule in the examples above may result in several competing dominating trajectories. In this case, the compression key concept may be generalized to include several sub-keys, where each sub-key corresponds to a dominated location trajectory (or cluster centroid) obtained from trajectories clustering. The sub-keys may then be grouped as needed to compress one or more location trajectories.

By way of example, the UE 101, the compression platform 103, the services 109 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
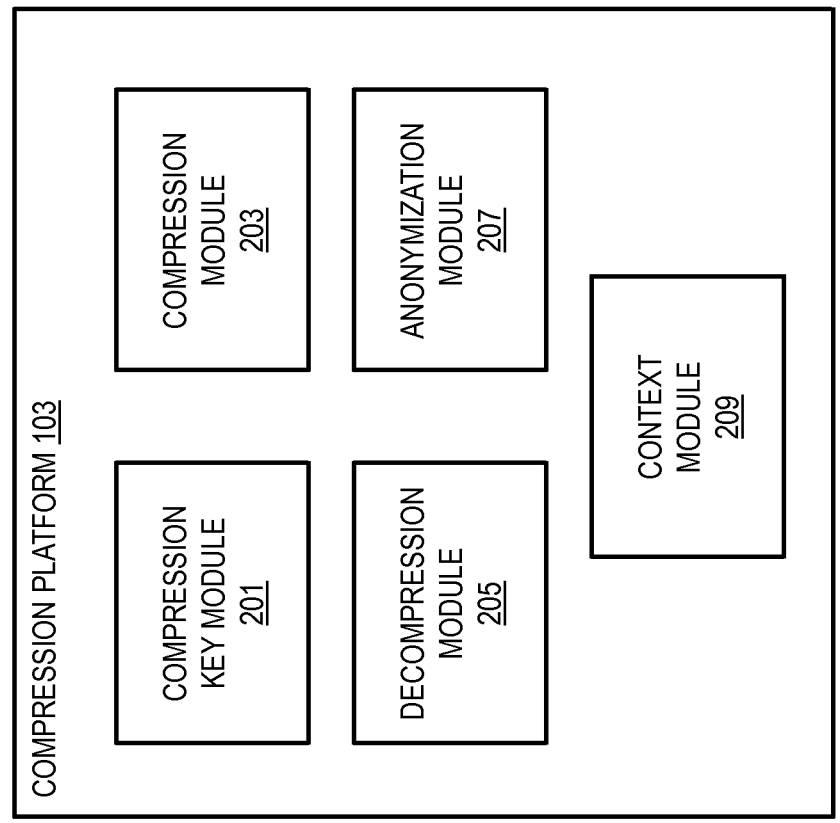
FIG. 2 is a diagram of the components of a compression platform 103, according to one embodiment.

FIG. 2 is a diagram of the components of the compression platform 103, according to one embodiment. By way of example, the compression platform 103 includes one or more components for compressing location trajectories based on underlying map structure. It is contemplated that the functions of these components may be combined in one or more components or performed by other components of equivalent functionality. In this embodiment, the compression platform 103 includes a compression key module 201, a compression module 203, a decompression module 205, an anonymization module 207 and a context module 209.

The compression key module 201 determines the compression keys used in compressing and decompressing one or more trajectories associated with a user. As described above, the compression key may be generated based on a map structure by determining intersections associated within the map structure and the outgoing roads associated with one or more of the intersections. The compression key may then be a combination of one or more of the outgoing roads such that, for example, for each intersection a number of outgoing roads are selected and included within the compression key. The number of outgoing roads used for generating the compression key for a particular intersection may be one less than the total number of outgoing roads for the particular intersection. Thus, for example, where an intersection has five outgoing roads, four of the outgoing roads may be selected to generate and/or be added to the compression key. In one embodiment, the four outgoing roads out of the total of five outgoing roads are selected at random. The following selection of outgoing roads may be performed for at least one intersection associated with the map structure and up to all of the intersections. However, in one embodiment, a partial compression key may be generated by selecting outgoing roads for less than the total number of intersections associated with a location trajectory. Thus, for example, if there are 10 intersections associated with a location trajectory, outgoing roads may be selected for only five of the intersections, which may allow for a partial compression of the location trajectory associated with the portion of the location trajectory in which outgoing roads were selected for the intersections.

In one embodiment, the compression key module 201 may control the selection of the outgoing roads for an intersection to control the compression of a location trajectory. For example, and as discussed above, for an intersection with five outgoing roads, four of the roads may be randomly selected to be included within the compression key. However, if one of the selected outgoing roads is a road that is always taken by the user when at the intersection, such as a common road is included within the compression key, the resulting compression is limited because for that portion of the location trajectory the common road cannot be removed. Thus, rather than always selecting random outgoing roads to be included within the compression key, the compression key module 201 may control the selection based on common roads associated with a user such that the common roads are not selected as part of the compression key and thus may be removed from within the location trajectory when generating the compressed location trajectory. The compression key module 201 may perform this control over the generation of the compression key based on common roads to establish an adaptive compression key generation. The idea of common roads may be expanded to cluster trajectories to derive a compression key as a cluster centroid and may be dynamically updated to dynamically update the creation of compression keys based on changes to context information associated with a user.

The compression module 203 and decompression module 205 compress and decompress the location trajectory and compressed location trajectory, respectively. Although illustrated in FIG. 2 as being two separate modules, in one embodiment the compression module 203 and the decompression module 205 may be combined into one module.

The compression module 203 compresses a location trajectory by determining whether a road associated with the location trajectory is contained within the associated compression key. Initially, the beginning and end roads of a location trajectory are maintained within the compressed location trajectory. Subsequently, for one or more roads between the first and last roads, the compression module 203 determines if a road along the location trajectory is also contained within the compression key. If the road is within the compression key, the road is maintained within the compressed location trajectory. If the road is not contained within the compression key, the road may be removed from the compressed location trajectory. This analysis may be performed for each intersection and/or road associated with a location trajectory to compress the location trajectory. In addition, this analysis may be performed for only a portion of the location trajectory to form a partially compressed location trajectory, such as a location trajectory that is compressed up to and/or after an intermediate intersection and/or road associated with the location trajectory.

Similarly, the decompression of the compressed location trajectory may be the opposite of the compression. Specifically, starting with the first road of a compressed location trajectory, the compressed location trajectory is compared to the map structure and the compression key. For each outgoing road that is not contained within the compressed location trajectory, the compression key is analyzed to determine for each intersection which outgoing road is not contained within the compression key. The road that is not contained within the compression key is the road that is added to the compressed location trajectory to form the decompressed location trajectory.

The anonymization module 207 performs anonymization analysis with respect to a compressed location trajectory or with respect to compressing a location trajectory. Because the generation of the compression key may, in one embodiment, be random based on selecting l−1 outgoing roads associated with an intersection, depending on which roads are taken along the location trajectory and which roads are randomly selected as part of the compression key, the compressed location trajectory may not be compressed more than a certain threshold. Similarly, the compressed location trajectory may not have a certain threshold of anonymity because a portion of the location trajectory remains above a set threshold. Accordingly, in one embodiment, the anonymization module 207 may control the outgoing roads that are selected to generate the compression key such that, for example, for an intersection along the location trajectory that has over a threshold number of outgoing roads, the outgoing road excluded from the compression key is the outgoing road taken by the user to exclude an outgoing road from the compressed location trajectory. Accordingly, the compressed location trajectory results in increased anonymity because for the intersection it is unclear which outgoing road was taken by the user and there are above a threshold number of outgoing roads associated with the intersection, thereby increasing the uncertainty of the actually taken outgoing road.

The context module 209 collects context information associated with the UE 101 and the user of the UE 101 to determine common roads for adapting the compression key to user patterns associated with trajectories. The context information may include, for example, past trajectories to determine location anchors (nodes) associated with a user where the user is located for over a specified period of time (e.g., over 30, 60 or 120 minutes). The context information collected by the context module may be further used based on a number of trajectories to cluster trajectories to determine compression keys that are a clustered centroid. In one embodiment, the context module 209 may also determine other user characteristics, such as user preference information and/or user profile information that may be used to control the generation of the compression key, such as by a user indicating one or more roads that should always be included or excluded from the compression key and/or compressed location trajectory.

Figure 3:
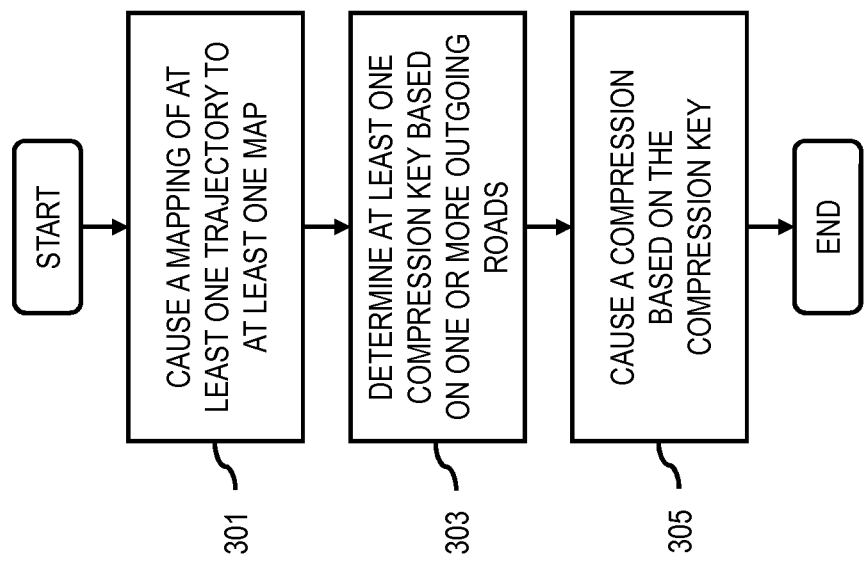
FIG. 3 is a flowchart of a process for compressing location trajectories based on map structure, according to one embodiment.
Figure 10:
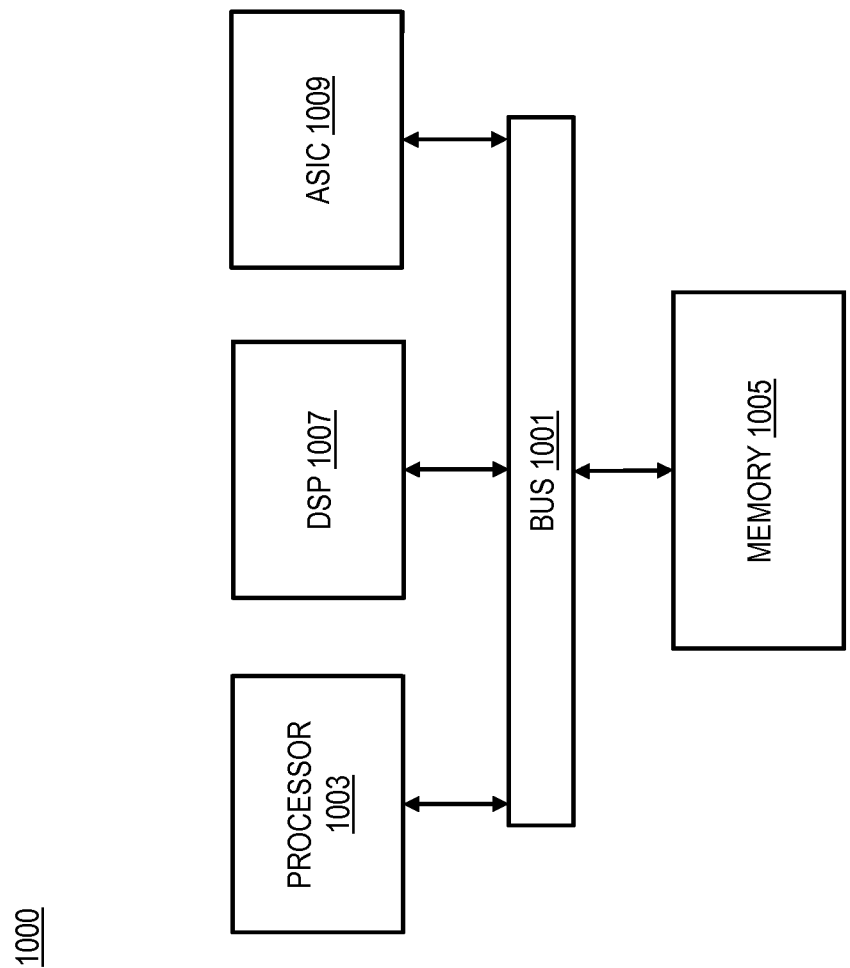
FIG. 10 is a diagram of a chip set that can be used to implement an embodiment of the invention.

FIG. 3 is a flowchart of a process for compressing location trajectories based on map structure, according to one embodiment. In one embodiment, the compression platform 103 performs the process 300 and is implemented in, for instance, a chip set including a processor and a memory as shown in FIG. 10. In step 301, the compression platform 103 causes, at least in part, a mapping of at least one location trajectory to at least one map to determine one or more intersections traveled along the at least one location trajectory. The location trajectory may initially be a sequence of GPS coordinates. The compression platform 103 maps the GPS coordinates to the map to associate the coordinates with one or more roads and/or one or more intersections. Thus, in one embodiment, the map may simply indicate roads correlated to geographic coordinates without any additional features. However, the map may be any level of detail as long as the map contains roads.

In step 303, the compression platform 103 determines at least one compression key based, at least in part, on one or more outgoing roads of the one or more intersections. The compression platform 103 may determine, for one or more intersections, one less than the total number of outgoing roads and combine these outgoing roads with outgoing roads of one or more other intersections, if applicable, to determine the compression key. The selection of the number of outgoing roads may be random or may be controlled based on, for example, one or more common outgoing roads to adapt the compression key (discussed below). Thus, in at least one embodiment, the compression key may include outgoing roads for intersections where the outgoing roads for each intersection are randomly selected.

In one embodiment, there may be one compression key that is created for an entire map (e.g., one map structure). In this case, all location trajectories may be compressed and decompressed using the same, single compression key. In this embodiment, the same compression key may be applied to more than one user. In one embodiment, each user may be associated with a single compression key that is based on an entire map (e.g., one map structure). In this case, all location trajectories associated with the specific user may be compressed and decompressed using the same, single compression key. This embodiment may increase the privacy and/or anonymization of compressed location trajectories because one compression key is not compatible with all users. In this case, the compression key may be adapted based on, for example, context information, user preference information and/or user profile information, as discussed below. Further, in one embodiment, each user may be associated with one or more compression keys that may be based on the entire structure, where one or more compression keys are not adapted to the user and one or more compression keys are adapted to the user. Further, one or more of the compression keys for the user may be adapted to control the anonymization of location trajectories associated with the user.

In one embodiment, the compression key may be based on different extents of the map and/or map structure rather than, for example, the entire map structure. By way of example, the map and/or map structure may be divided into smaller portions where each portion is associated with a single compression key. Where a location trajectory is entirely within a single portion of the map structure, the compression key associated with that map structure may be used to compress and decompress the location trajectory. In one embodiment, although the map and/or map structure is divided into smaller portions, there still may be one compression key that is associated with the entire map structure to handle cases where, for example, a single location trajectory crosses between two or more portions of the map and/or map structure. The portions that the map is divided into may be of any size and or shape, and also may be of any granularity. For example, one compression key may be used for location trajectories that are associated with highways and another, different location trajectory may be associated with local and/or rural roads. When a location trajectory extends between granularities, such as when a user exits a highway onto a rural road, both compression keys may be used to compress and decompress the location trajectory.

In one embodiment, where the compression key may be used for an entire map structure, for example, a single segment of a road may be identified by more than one identification to prevent issues associated with compressing/decompressing. By way of example, an intersection $s_1$ within the trajectory may include 4 outgoing roads $a_1$, $a_2$, $a_3$ and $a_4$. An intersection $s_2$ that is adjacent to intersection $s_1$ may share outgoing road $a_2$ (for example, road $a_2$ connects intersection $s_1$ and intersection $s_2$). In which case, road $a_2$ may be selected as an outgoing road for one intersection but not the other within the compression key, thus resulting in potential errors in compressing and/or decompressing a location trajectory. Thus, in determining the compression key, road $a_2$ may be identified differently as an outgoing road for each intersection, such as outgoing road $a_{1,2}$ for intersection $s_1$ and outgoing road $a_{2,1}$ for intersection $s_2$. However, any method may be used to distinguish the same road as different outgoing roads where the road is associated with two or more intersections.

In one embodiment, a compression key may be specific to one or more location trajectories. By way of example, each time a user compresses a location trajectory, a new compression key may be determined that is specific to that specific location trajectory, including the specific roads and intersections of the location trajectory. In such an embodiment, two different location trajectories that share, at least in part, one or more of the same roads and/or intersections may be compressed differently based on different compression keys and, for example, the random determination of the compression keys based on randomly selecting outgoing roads for the intersections of the location trajectory. In such an embodiment, the compression platform 103 may associate the different location trajectories with the different compression keys. Further, in such an embodiment, the compression keys for each location trajectory may be stored, for example, at the UE 101 associated with the compression keys, at one or more content providers 113 and/or services 109, or a combination thereof. Although such an embodiment may increase the number of compression keys associated with, for example, a single user and/or single UE 101, such an embodiment may increase the privacy and/or anonymization by not having a single compression key that may be used to compress/decompress multiple location trajectories if, for example, the compression key were to be obtained by an unauthorized party or entity.

In step 305, the compression platform 103 causes, at least in part, a compression of the at least one location trajectory based, at least in part, on the at least one compression key. Based on the one or more roads that are used to generate the at least one location trajectory, the compression platform 103 may cause, at least in part, a removal of at least one road associated with the at least one location trajectory if the at least one road is excluded within the at least one compression key to compress the at least one location trajectory. Because the inclusion of the outgoing roads within the compression key is random, whether a road that is associated with the taken location trajectory is also associated with the compression key is also random, allowing for a compression of some of the roads associated with the location trajectory. For example, for some of the intersections, the taken outgoing road will be included within the compression key, and will therefore be included within the compressed location trajectory, and for some of the intersections, the taken outgoing road will not be included within the compression key, and will therefore be excluded within the compressed location trajectory.

In one embodiment, the compression platform 103 may determine one or more intermediate intersections, one or more intermediate roads, or a combination thereof associated with the at least one location trajectory. The intermediate roads and/or intersections may be designated by the compression platform 103, such as universal intermediate roads, and/or designated by the user associated with the location trajectory (e.g., based user profile information and/or user preference information). By way of example, the user may indicate in association with a location trajectory one or more intermediate roads and/or intersections. Based on the one or more intermediate roads and/or intersections, the compression platform 103 may partially compress the location trajectory. The partial compression may be, for example, from the beginning of the location trajectory up to an intermediate road and/or intersection, from an intermediate road and/or intersection to the end of the location trajectory, or between two intermediate roads and/or intersections. Thus, only a portion of the location trajectory may be compressed according to the compression key. In which case, the compression key may be generated for the entire location trajectory or may be generated solely for the partial portion of the location trajectory that is to be compressed.

Figure 4:
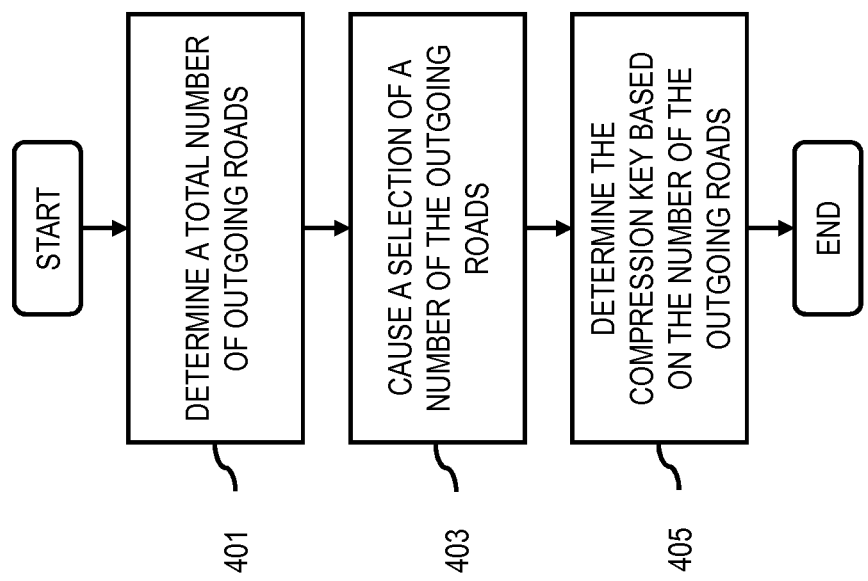
FIG. 4 is a flowchart of a process for determining a compression key, according to one embodiment.

FIG. 4 is a flowchart of a process for determining a compression key, according to one embodiment. In one embodiment, the compression platform 103 performs the process 400 and is implemented in, for instance, a chip set including a processor and a memory as shown in FIG. 10. In step 401, as discussed above, the compression platform 103 may initially determine a total number of outgoing roads of at least one intersection of the one or more intersections associated with a location trajectory. The compression platform 103 may determine the outgoing roads for one intersection, such as for a partial compression, or any number of the intersections of the location trajectory, such as all of the intersections for a full compression of the location trajectory. In one embodiment, the outgoing roads for an intersection may exclude the road that was used to approach the intersection (e.g., the incoming road). In one embodiment, the outgoing roads for an intersection may include and/or distinguish the road that was used to approach the intersection (e.g., the incoming road is also considered an outgoing road).

In step 403, the compression platform 103 causes, at least in part, a selection of a number of the outgoing roads for the at least one intersection. The number may be l–1, where l is the total number of outgoing roads. Thus, if there are four outgoing roads, three of the outgoing roads are selected. Further, the selection of the three outgoing roads may be random. The compression platform 103 may perform such analysis for each road and/or intersection associated with the map structure and/or location trajectory depending on how the compression key is intended to be determined. Thus, in step 405, the compression key is generated by compiling the selected outgoing roads for each intersection. The generated compression key may then be stored at the UE 101, at one or more content providers 113 and/or services 109, or both.

Figure 5:
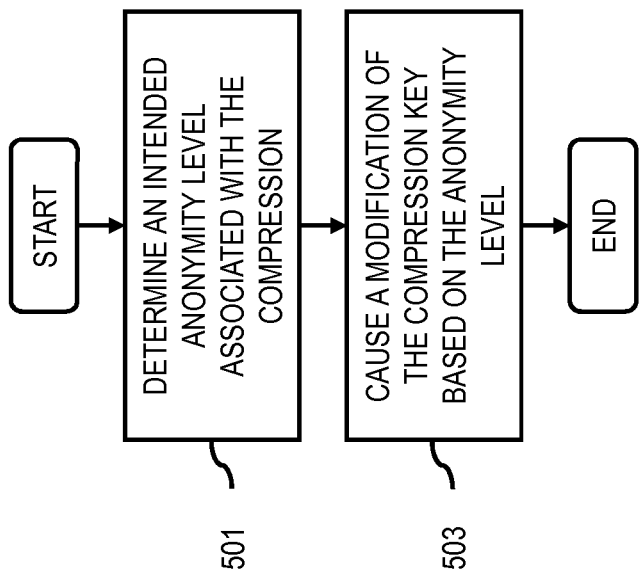
FIG. 5 is a flowchart of a process for controlling the anonymity of a compressed location trajectory, according to one embodiment.

FIG. 5 is a flowchart of a process for controlling the anonymity of a compressed location trajectory, according to one embodiment. In one embodiment, the compression platform 103 performs the process 500 and is implemented in, for instance, a chip set including a processor and a memory as shown in FIG. 10. In step 501, the compression platform 103 determines an intended anonymity level associated with the compression of the at least one location trajectory. The anonymity level may be determined based on, for example, the number of possible routes between two adjacent roads saved within the compressed location trajectory. Thus, by way of example, if roads $a_1$ and $a_6$ are adjacent within the compressed location trajectory but not adjacent with respect to the map structure, the compression platform 103 may determine the number of possible routes between the roads $a_1$ and $a_6$ and use the number of possible routes to define the anonymity level. By way of example, the anonymity level may be determined based on a single, random selection of two adjacent roads that are not connected with respect to the map structure, may be determined on an average number of possible routes between all adjacent roads that are not connected, or may be determined based on a total number of possible routes between all adjacent roads that are not connected.

In step 503, if the resulting anonymity level of the compressed location trajectory is below a threshold level, the compression platform 103 may remove one or more roads within the compressed location trajectory that include more than a threshold number of outgoing roads. Removing one or more roads with a threshold number of outgoing roads increases the anonymity level by increasing the possible number of routes between two adjacent roads within the compressed route that are not adjacent within the map. By removing the road from the compressed location trajectory, the compression platform 103 also removes the road from the compression key to allow for subsequently decompressing the compressed location trajectory, as discussed above.

Figure 6:
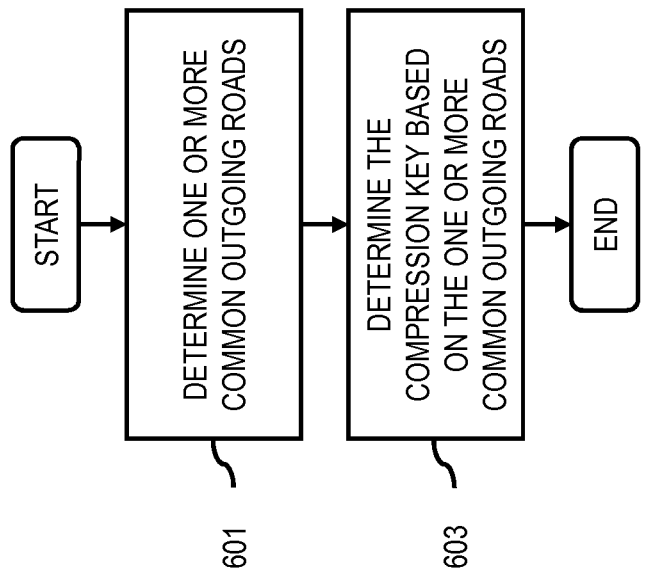
FIG. 6 is a flowchart of a process for adapting a compression key for compressing and decompressing a location trajectory, according to one embodiment.

FIG. 6 is a flowchart of a process for adapting a compression key for compressing and decompressing a location trajectory, according to one embodiment. In one embodiment, the compression platform 103 performs the process 600 and is implemented in, for instance, a chip set including a processor and a memory as shown in FIG. 10. In step 601, a user may normally take the same outgoing road from an intersection, or several roads along a common location trajectory, when traveling between two points several times over a specified time period. This information may be used by the compression platform 103 to adapt the compression key and thereby control the level of compression for the compressed location trajectory. Thus, the compression platform 103 may determine whether one or more of the outgoing roads of one or more intersections are common outgoing roads based, at least in part, on context information associated with the user, user profile information, user preference information, or a combination thereof. By way of example, a user may specify one or more common roads that may be used by the compression platform 103 to adapt the compression key by entering such information into a user profile and/or by user preference information. Alternatively, or in addition, the compression platform 103 may determine context information associated with the user, such as location information in the form of trajectories, and determine common outgoing roads from the context information. In one embodiment, as common outgoing roads associated with a user may change over time, the compression platform 103 may also cause, at least in part, a monitoring of the context information associated with the user to determine one or more changes to the one or more common outgoing roads. Thus, by way of example, if a user always takes a certain route of one or more roads to travel to work every day, the compression platform 103 may determines these roads are common roads.

In step 603, the compression platform 103 determines the at least one compression key based, at least in part, on one or more common outgoing roads. For example, if a determined common outgoing road is within a location trajectory that is being compressed, rather than selecting random outgoing roads associated with the an intersection for building the compression key, the outgoing roads other than the common outgoing roads may be selected to form the compression key with respect to the intersection such that the common outgoing road within the location trajectory is removed to generate the compressed location trajectory. Further, the above process may be performed to cluster trajectories to determine a compression key as a cluster centroid. By determining compression keys based on a cluster centroid, the compression platform 103 may compute compression keys dynamically based on user patterns, and adapt to the user patterns.

Figure 7:
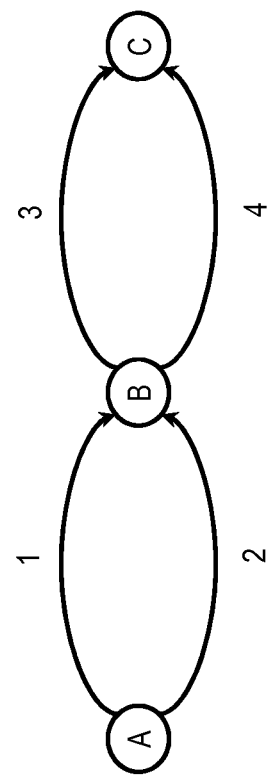
FIG. 7 is a simplified diagram for illustrating the generation of a compression key and compressing a location trajectory, according to one embodiment.

FIG. 7 is a simplified diagram for illustrating the generation of a compression key and compressing a location trajectory, according to one embodiment. Specifically, FIG. 7 illustrates three intersections A, B and C (e.g., states) and four roads 1, 2, 3 and 4. As illustrated, roads 1 and 2 connect intersections A and B, and roads 3 and 4 connect intersections B and C. An exemplary compression key may be generated from the three intersections A-C by randomly selecting one road (e.g., 1-1) between each intersection. For example, roads 1 and 3 may be selected to generate the compression key. Accordingly, if the location trajectory a user takes between intersections A-C is roads 2 and 4, there will be 100% compression between intersections A and C because roads 2 and 4 are not included within the compression key and can therefore be excluded from the compressed location trajectory. However, if the location trajectory a user takes between intersections A-C is roads 1 and 3, there will be 0% compression between intersections A and C because roads 1 and 3 are included within the compression key and therefore must be included within the compressed location trajectory. Similarly, 50% compression may be achieved if one of the roads taken along the location trajectory is within the compression key and if the other road taken is not within the compression key (e.g., location trajectory of 1 and 4 or 2 and 3).

Figure 8A:
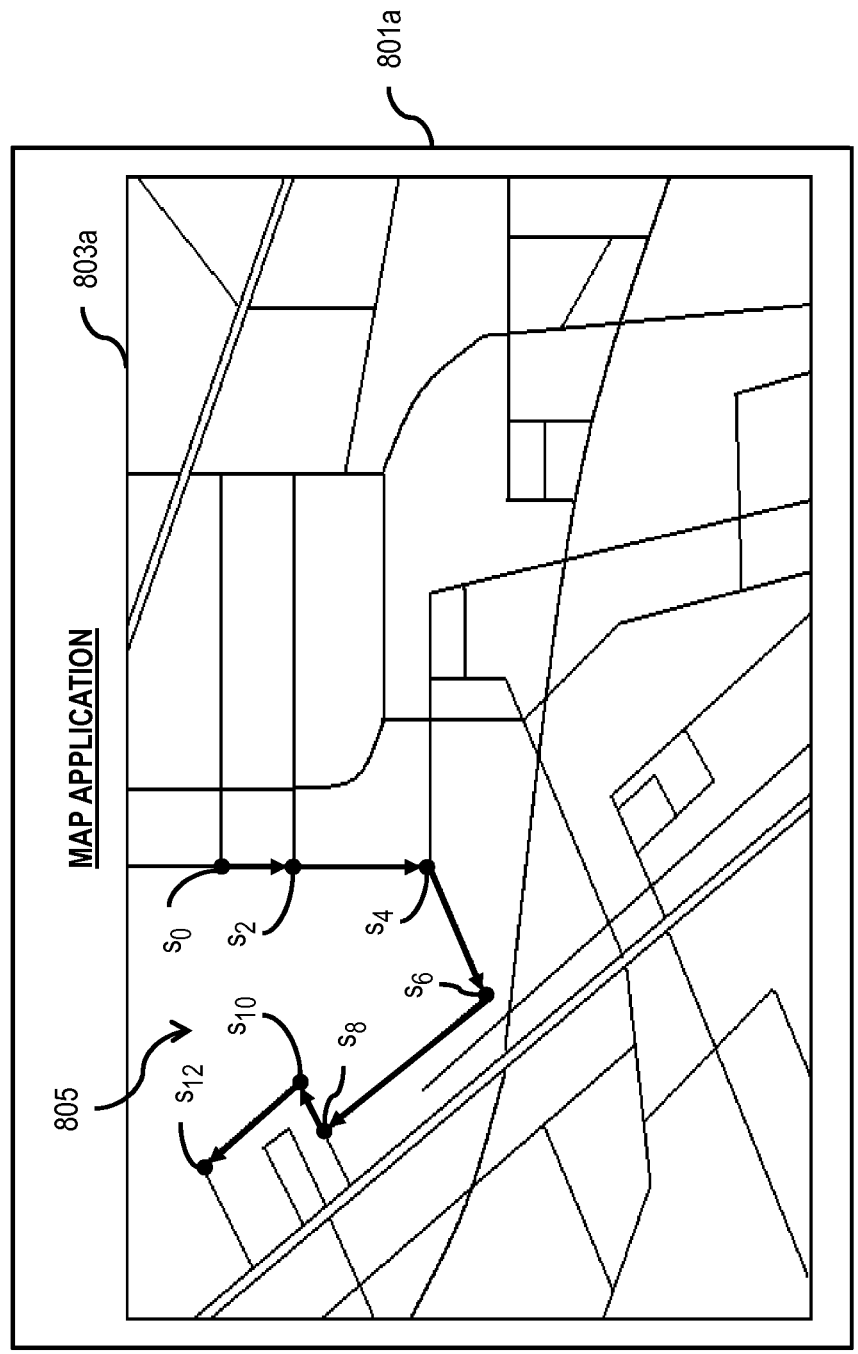
FIGS. 8A and 8B are diagrams of user interfaces utilized in the processes of FIGS. 3-6, according to various embodiments.
Figure 8B:
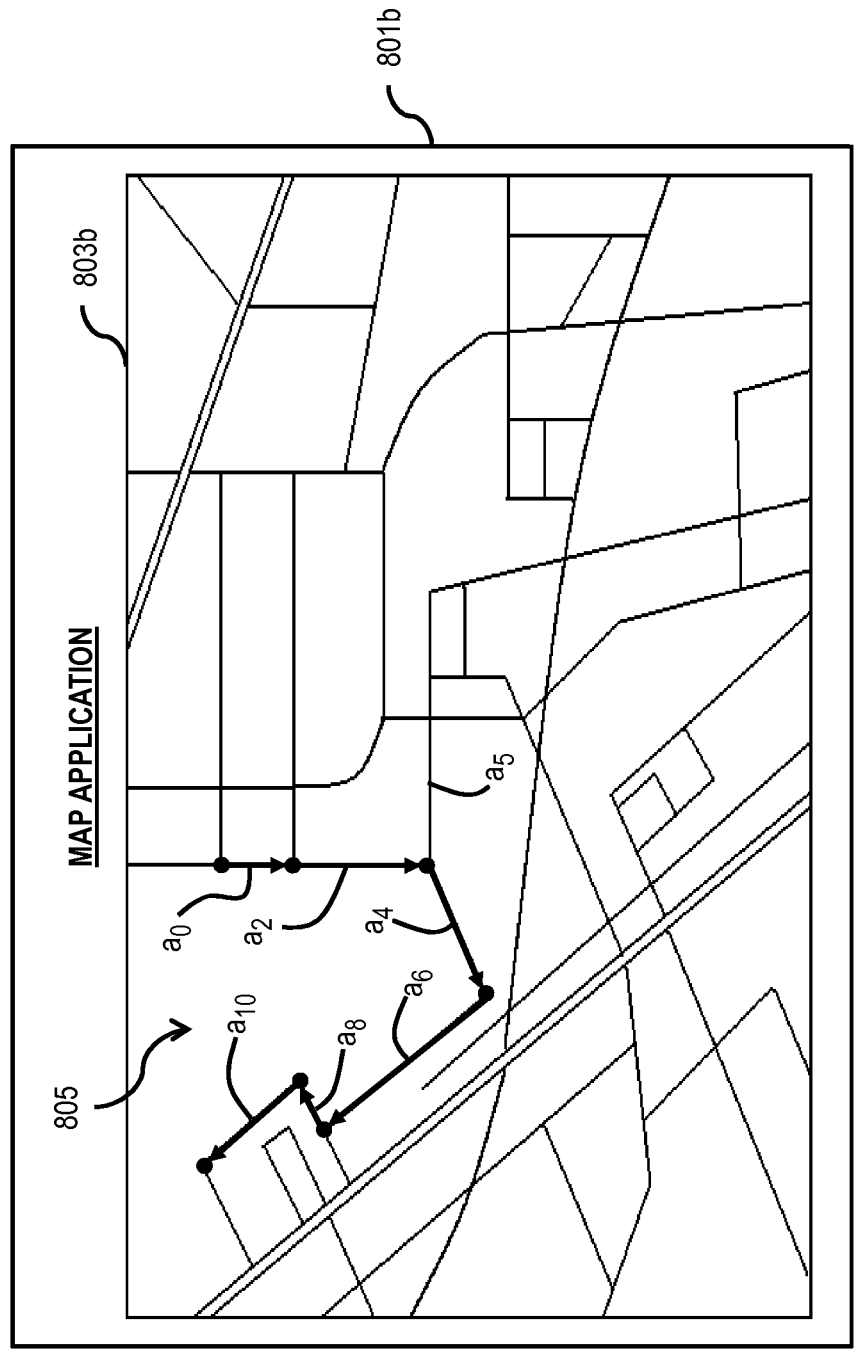

FIGS. 8A and 8B are diagrams of user interfaces utilized in the processes of FIGS. 3-6, according to various embodiments. FIG. 8A illustrates a user interface 801a of, for example, a UE 101 illustrating a map 803a that displays a location trajectory 805 taken by a user defined by intersections (e.g., states) $s_0$, $s_2$, $s_4$, $s_6$, $s_8$, $s_{10}$, and $s_{12}$. FIG. 8B illustrates a user interface 801b of, for example, the UE 101 illustrating a map 803b that displays the same location trajectory 805 taken by the user as defined by roads $a_0$, $a_2$, $a_4$, $a_6$, $a_8$, and $a_{10}$. As illustrated in FIG. 8B with respect to, for example, intersection $s_4$ (FIG. 8A), in one embodiment the intersection has three outgoing roads $a_2$, $a_4$, and $a_5$ (where an incoming road used to approach the intersection is also considered an outgoing road). In generating the compression key with respect to the intersection $s_4$, outgoing roads $a_2$ and $a_5$ may be randomly selected as the outgoing roads to generate the compression key. Thus, if the user takes outgoing road $a_4$, as illustrated, because outgoing road $a_4$ is not within the compression key, the compressed location trajectory may exclude road $a_4$. However, if outgoing roads $a_2$ and $a_4$ were randomly selected instead, the outgoing road $a_4$ taken by the user would be included in the compressed location trajectory because there is otherwise no way of determining based on the compressed location trajectory and compression key which road the user took. The same analysis may be performed for one or more of the intersections $a_2$, $a_6$, and $a_8$ to partially or fully compress the location trajectory.

The processes described herein for compressing location trajectories based on map structure may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
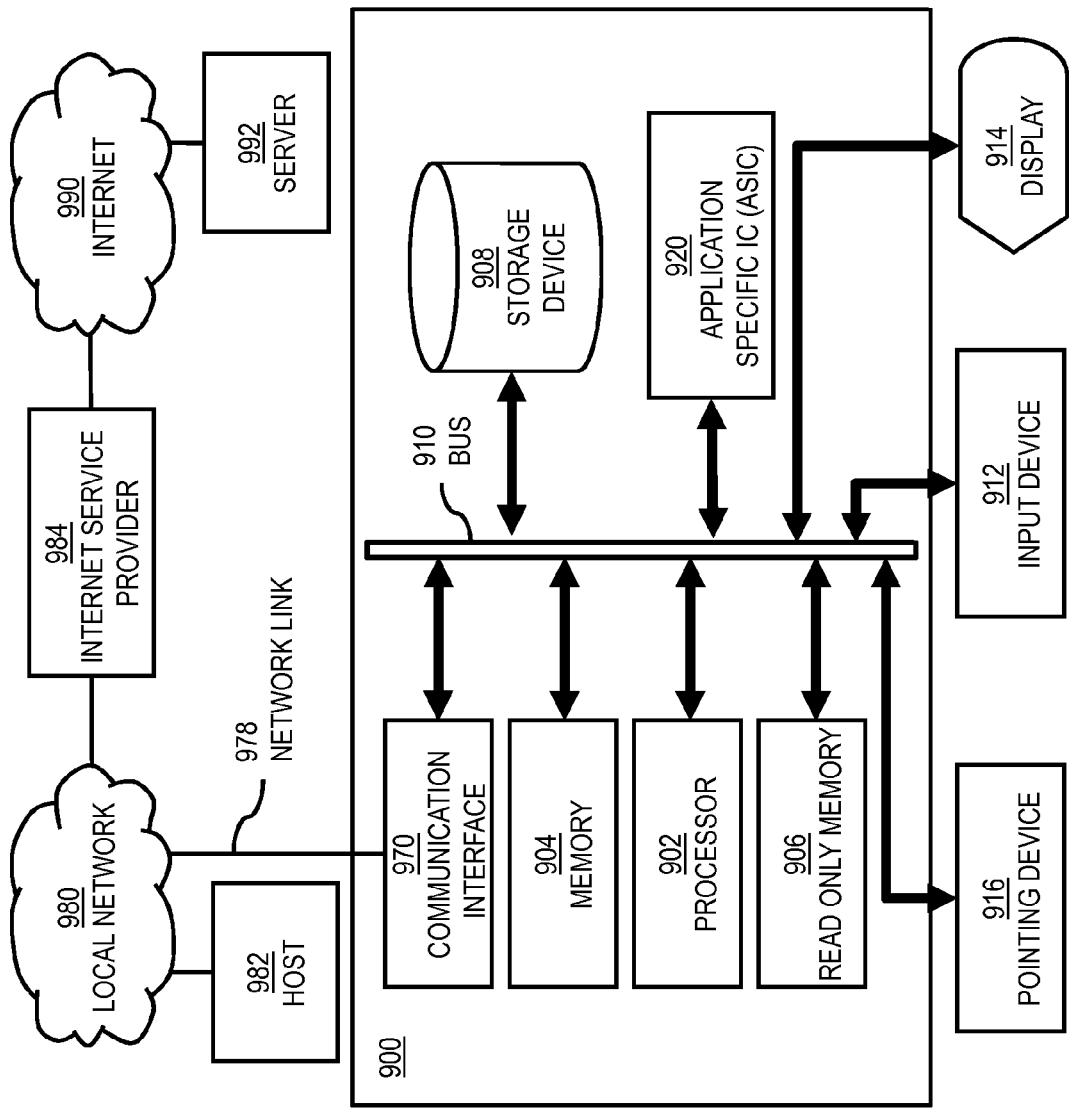
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to compress location trajectories based on map structure as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of compressing location trajectories based on map structure.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to compressing location trajectories based on map structure. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for compressing location trajectories based on map structure. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for compressing location trajectories based on map structure, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL)

card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for compressing location trajectories based on map structure.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to compress location trajectories based on map structure as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of compressing location trajectories based on map structure.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to compress location trajectories based on map structure. The memory 1005 also stores the data associated with or generated by the execution of the inventive steps.

Figure 11:
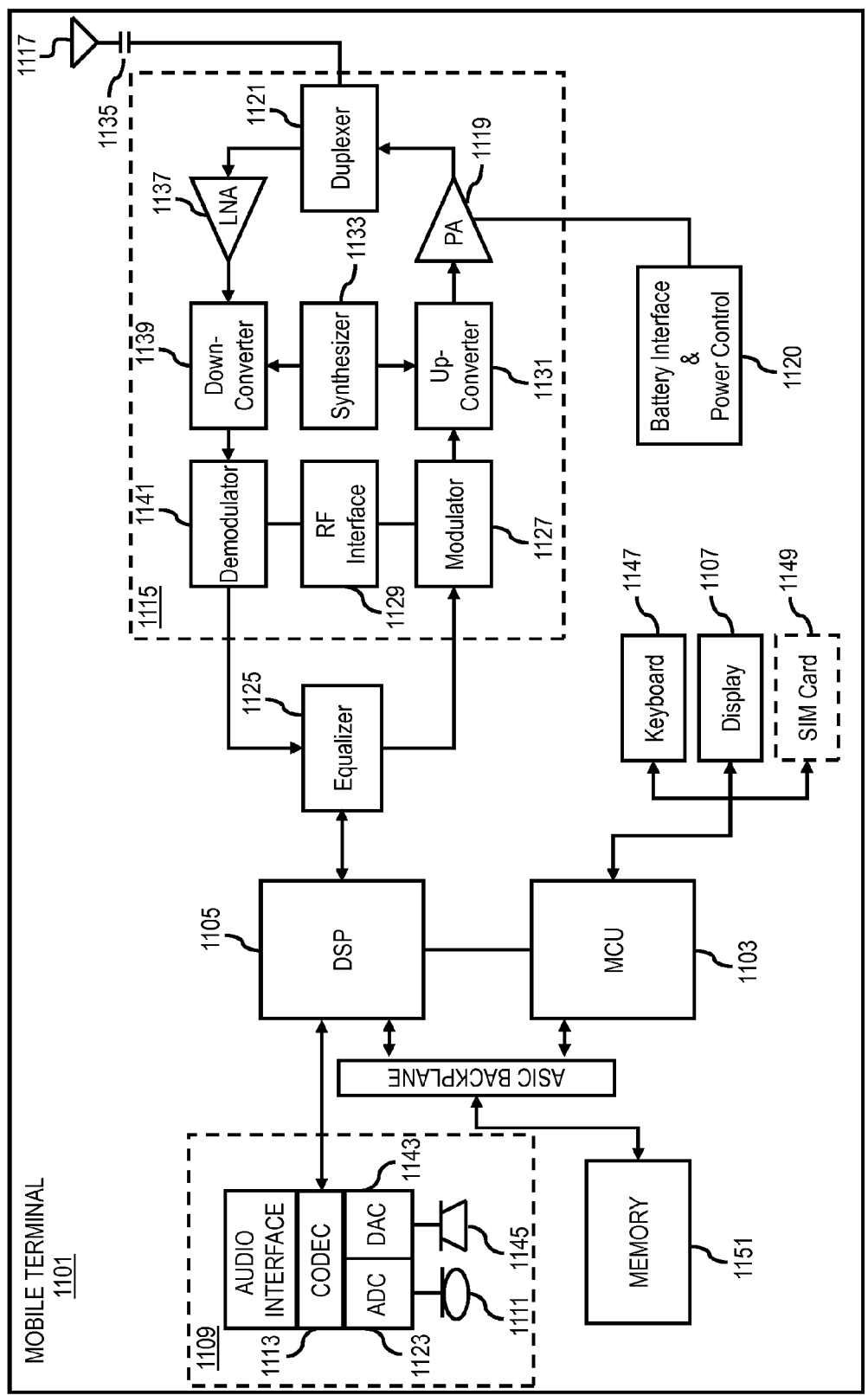
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of compressing location trajectories based on map structure. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of compressing location trajectories based on map structure. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to compress location trajectories based on map structure. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, a mapping of at least one location trajectory to at least one map to determine one or more intersections traveled along the at least one location trajectory, wherein the at least one location trajectory comprises a sequence of roads that follow a route previously taken by a user applied to roads of the at least one map;
   determining, by at least one processor, at least one compression key based, at least in part, on one or more outgoing roads of the one or more intersections;
   causing, at least in part, a compression of the at least one location trajectory based, at least in part, on the at least one compression key;
   determining one or more intermediate intersections, one or more intermediate roads, or a combination thereof associated with the at least one location trajectory,
   wherein the compression of the at least one location trajectory is a partial compression based, at least in part, on the one or more intermediate intersections, the one or more intermediate roads, or a combination thereof.

2. A method of claim 1, further comprising:
   determining a total number of outgoing roads of at least one intersection of the one or more intersections;
   causing, at least in part, a selection of a number of the outgoing roads for the at least one intersection; and
   determining the at least one compression key based, at least in part, on the number of the selected outgoing roads.

3. A method of claim 2, wherein the number of the selected outgoing roads is one less than the total number of outgoing roads.

4. A method of claim 2, wherein the selected outgoing roads are selected randomly.

5. A method of claim 2, further comprising:
   determining an intended anonymity level associated with the compression of the at least one location trajectory; and
   causing, at least in part, a modification of the at least one compression key based, at least in part, on including one or more roads associated with above a threshold number of outgoing roads,
   wherein the at least one location trajectory contains historical location information.

6. A method of claim 1, further comprising:
   determining one or more roads associated with the at least one location trajectory; and
   causing, at least in part, a removal of at least one road associated with the at least one location trajectory if the at least one road is excluded within the at least one compression key to compress the at least one location trajectory.

7. A method of claim 1, further comprising:
determining whether one or more of the outgoing roads are common outgoing roads based, at least in part, on context information associated with the user, user profile information, user preference information, or a combination thereof; and
determining the at least one compression key based, at least in part, on one or more common outgoing roads.

8. A method of claim 7, further comprising:
causing, at least in part, a monitoring of context information associated with the user to determine one or more changes to the one or more common outgoing roads; and
determining one or more other compression keys based, at least in part, on the one or more changes.

9. A method of claim 8, further comprising:
causing, at least in part, a storing of the at least one compression key and the one or more other compression keys.

10. An apparatus comprising:
at least one processor; and
at least one memory including computer program code for one or more programs,
the at least one memory and the computer program code configured to, with the at least one processor, cause the apparatus to perform at least the following,
cause, at least in part, a mapping of at least one location trajectory to at least one map to determine one or more intersections traveled along the at least one location trajectory, wherein the at least one location trajectory comprises a sequence of roads that follow a route previously taken by a user applied to roads of the at least one map;
determine at least one compression key based, at least in part, on one or more outgoing roads of the one or more intersections;
cause, at least in part, a compression of the at least one location trajectory based, at least in part, on the at least one compression key;
determine one or more intermediate intersections, one or more intermediate roads, or a combination thereof associated with the at least one location trajectory,
wherein the compression of the at least one location trajectory is a partial compression based, at least in part, on the one or more intermediate intersections, the one or more intermediate roads, or a combination thereof.

11. An apparatus of claim 10, wherein the apparatus is further caused to:
determine a total number of outgoing roads of at least one intersection of the one or more intersections;
cause, at least in part, a selection of a number of the outgoing roads for the at least one intersection; and
determine the at least one compression key based, at least in part, on the number of the selected outgoing roads.

12. An apparatus of claim 11, wherein the number of the selected outgoing roads is one less than the total number of outgoing roads.

13. An apparatus of claim 11, wherein the selected outgoing roads are selected randomly.

14. An apparatus of claim 11, wherein the apparatus is further caused to:
determine an intended anonymity level associated with the compression of the at least one location trajectory; and
cause, at least in part, a modification of the at least one compression key based, at least in part, on including one or more roads associated with above a threshold number of outgoing roads,
wherein the at least one location trajectory contains historical location information.

15. An apparatus of claim 10, wherein the apparatus is further caused to:
determine one or more roads associated with the at least one location trajectory; and
cause, at least in part, a removal of at least one road associated with the at least one location trajectory if the at least one road is excluded within the at least one compression key to compress the at least one location trajectory.

16. An apparatus of claim 10, wherein the apparatus is further caused to:
determine whether one or more of the outgoing roads are common outgoing roads based, at least in part, on context information associated with the user, user profile information, user preference information, or a combination thereof; and
determine the at least one compression key based, at least in part, on one or more common outgoing roads.

17. An apparatus of claim 16, wherein the apparatus is further caused to:
cause, at least in part, a monitoring of context information associated with the user to determine one or more changes to the one or more common outgoing roads; and
determine one or more other compression keys based, at least in part, on the one or more changes.

18. An apparatus of claim 17, wherein the apparatus is further caused to:
cause, at least in part, a storing of the at least one compression key and the one or more other compression keys.

* * * * *